3,190,909
PREPARATION OF ALPHA,OMEGA-
DICYANOOLEFINS
Yanosuke Inaba, Fujisawa, Kanagawa, and Goro Kimura and Shozo Kaichi, Kamakura, Kanagawa, Japan, assignors to Toyo Koatsu Industries, Inc., Tokyo, Japan, a corporation of Japan
No Drawing. Filed Oct. 11, 1962, Ser. No. 229,996
Claims priority, application Japan, Nov. 6, 1961,
36/3,949
14 Claims. (Cl. 260—465.8)

This invention relates to processes for the preparation of alpha,omega-dicyanoolefins from trihaloalkanes having the formula

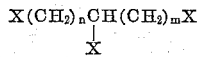

wherein X is a halogen, e.g., Cl, Br, or I, and $m$ and $n$ are integers each at lest equal to 2 and $m+n$ is an integer from 5 to 10, preferably 4 to 9.

Many methods for the preparation of alpha,omega-dinitrile are well-known in the art and involve reacting straight-chain alpha,omega-dihaloalkanes having one halogen atom at each terminal with metal cyanides, particularly alkali cyanides.

It is a primary object of this invention to provide a process for the preparation of alpha,omega-dicyanoolefins by selectively nitrilizing only the primary halogens of trihaloalkanes followed by isolation of the secondary halogen as hydrogen halide.

According to the process of this invention, alpha,omega-dicyanoolefins are prepared by reacting trihaloalkanes with alkali cyanides at a ratio of 2 mols or slightly over 2 mols of an alkali cyanide per mol of trihaloalkane, to nitrilize selectively the primary halogens of the trihaloalkane; subsequently heating the resulting intermediate or reacting the resulting intermediate with caustic alkali to isolate the secondary halogen atoms as hydrogen halide.

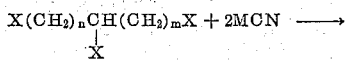

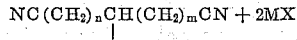
(1)

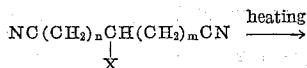

NC(CH₂)ₙCH=CH(CH₂)ₘ₋₁CN + HX (2)

or

NC(CH₂)ₙ₋₁CH=CH(CH₂)ₘCN + HX

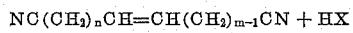

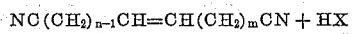
(3)

or

NC(CH₂)ₙ₋₁CH=CH(CH₂)ₘCN + MX wherein X, $m$, $n$ and $m+n$ are as defined above and M is alkali metal.

As a result of intensive researches on the reaction of trihaloalkanes with alkali cyanides, we have found that there is a great difference in the reaction behavior of alkali cyanides with the halogen combined with a primary carbon atom (primary halogen) and the halogen combined with a secondary carbon atom (secondary halogen). That is, it was discovered that although primary halogens react with alkali cyanide comparatively readily to produce nitriles the reaction velocity of secondary halogens with alkali cyanide under the same conditions is exceedingly slow. For example, when 1,4,7-trichloroheptane was reacted in methyl Cellosolve at 124° C. with sodium cyanide at a molar ratio of 1:2.1, the total of the nitrilizing velocities of both primary chlorines (combined with carbon atoms of 1st position and 7th position) was about 16 times greater than the total of the velocities of various reactions (mainly, the nitrilizing reaction and the dehydrochlorination reaction) caused by the secondary chlorine (combined with the carbon atom of the 4th position), and the reaction product comprised 90% of 1,7-dicyano-4-chloroalkane, 5% of 1,7-dicyanoheptene-3, 2% of 1,4,7-tricyanoheptane, the remaining 3% consisting of 1,4-dichloro-7-cyanoheptane and various vinyl compounds.

In selectively nitrilizing the primary chlorine of the trihaloalkane, therefore, it is sufficient to react the trihaloalkane with the alkali cyanide at a ratio of 2 mols or slightly over 2 mols of alkali cyanide per mole of trihaloalkane, the most preferable ratio 2 to 2.5 mols of alkali cyanide to 1 mol of trihaloalkane. In carrying out this reaction, the reaction temperature depends upon the kinds of halogens contained in trihaloalkane; about 15–150° C. is suitable for tribromoalkanes and triiodoalkanes and about 70–160° C. for trichloroalkanes. It is preferable to employ inert solvents, for example, methyl Cellosolves, ethyl Cellosolve, water, methanol, ethanol, dimethylsulfoxide, methylformamide, dimethylformamide, methylacetamide etc. or mixtures of thereof. Methyl "Cellosolve" is ethylene glycol monomethyl ether. Instead of employing alkali cyanide, the reaction may be carried out by the addition of liquid or gaseous hydrogen cyanide of 2 mols or a little over 2 mols per mol of trihaloalkane to a solution containing trihaloalkane and caustic alkali at a molar ratio of 1:1 or 1:a little over 1.

The secondary halogen can readily be removed as hydrogen halide by either heating, or reacting with caustic alkali, the alpha,omega-dicyanohaloalkane obtained by nitrilizing the primary halogen atoms of the trihaloalkane with an alkali metal cyanide. That is, the secondary halogen is removed as hydrogen halide together with the hydrogen combined with the carbon atom adjacent to the carbon atom combined with said secondary halogen, thereby forming the alpha,omega-dicyanoolefin. In dehydrohalogenating by heating the alpha,omega-dicyanohaloalkane, the heating temperature depends upon the kinds of secondary halogens involved; about 150–200° C. being suitable for alpha,omega-dicyanobromoalkane and alpha,omega-dicyanoiodoalkane, and about 200–320° C. for alpha,omega-dicyanochloroalkane. In case the dehydrohalogenation of alpha,omega-dicyanohaloalkane is carried out with caustic alkali, the caustic alkali is either dissolved in a reaction product of trihaloalkane with alkali cyanide or added as an aqueous solution and the reaction is effected at about 30–130° C. It is preferable, in this case, to employ alpha,omega-dicyanohaloalkane and caustic alkali at a molar ratio of 1 : about 1. In carrying out the dehydrohalogenation of alpha,omega-dicyanohaloalkane by the reaction with caustic alkali, the primary halogen is selectively nitrilized with addition of liquid or gaseous hydrogen cyanide of 2 or a little over 2 mols per mol of trihaloalkane to a solution containing trihaloalkane and caustic alkali of about 3 mols or more per mol of said trihaloalkane, resulting in the removal of the secondary halogen by excessive caustic alkali.

This invention can be applied in the same way as mentioned above to mixtures of alpha,omega-dihaloolefin and trihaloalkane to produce alpha,omega-dicyanoolefin in high yields.

Hydrogenation of alpha,omega-dicyanoolefin, obtained in accordance with the present invention, in the presence of Ni or Co catalyst, yields the corresponding saturated alpha,omega-diamine.

The process will be further illustrated in conjunction with the following specific examples. It should be understood, however, that the examples are given for the purpose of illustration and not by way of limitation. The parts hereinafter mentioned are represented by weight.

*Example 1*

50 parts of 1,4,7-trichloroheptane, 25 parts of sodium cyanide and 100 parts of methyl Cellosolve were placed in a 3-mouth 300 cc. flask equipped with a thermometer, an agitator and a reflux condenser, and heated under reflux at 124° C. After 6 hours inorganic matter was removed by filtering the contents of the flask and the filtrate was distilled as it was. After distilling off the solvent, methyl Cellosolve, the pressure was reduced to 22 mm. Hg and the temperature was elevated while passing nitrogen gas. The decomposition of the contents started at a temperature higher than 240° C., evolving a great volume of hydrogen chloride. Evolution of HCl stopped in about 20 minutes. A small amount of a low boiling substance was eliminated and subsequently the main distillate (190–210° C./22 mm. Hg) was distilled off which was substantially pure 1,7-dicyanoheptene-3 in an amount of 30.9 parts (85% yield based on the starting trichloroheptane). The contents of the flask had distilled off almost completely before the temperature attained 300° C.

*Example 2*

50 parts of 1,4,9-trichlorononane, 22 parts of sodium cyanide and 200 parts of methyl Cellosolve were placed in an appartus similar to the one in Example 1 and heated under reflux at 127° C. for 10 hours. By following the decomposition procedure described in Example 1, 27.4 parts of 1,9-dicyanononene-3 (or 1,9-dicyanononene-4) were obtained. The yield was 72% based on the starting trichlorononane.

*Example 3*

50 parts of 1,4,7-tribromoheptane, 20.5 parts of potassium cyanide, 80 parts of ethanol and 20 parts of water were placed in an apparatus similar to the one in Example 1, and the mixture was heated under reflux at 84° C. for 3 hours. Inorganic matter was removed by filtering the contents of the flask and the filtrate was distilled as it was. Decomposition started at a temperature higher than 150° C., evolving a great volume of hydrogen bromide gas before the temperature attained 200° C. What distilled off at a temperature of 240–300° C. was substantially pure 1,7-dicyanoheptene-3. The amount obtained was 15.4 parts and the yield 70% based on the starting tribromoheptane.

*Example 4*

50 parts of 1,4,7-tribromoheptane, 24.3 parts of an aqueous solution of 30% sodium cyanide, 17.1 parts of an aqueous solution of 60% potassium cyanide and 80 parts of ethanol were placed in an apparatus similar to the one in Example 1, and the mixture was heated under reflux at 84° C. for 3 hours. Subsequently, agitation was continued while a solution, prepared by dissolving 5.9 parts of sodium hydroxide in 10 parts of water, was added drop-wise to the contents of the flask maintained at the same temperature (84° C.). After the drop-wise addition, which took 30 minutes, agitation was continued for 10 minutes, then the contents of the flask were cooled. After cooling, the contents were neutralized with dilute hydrochloric acid employing phenolphthalein as an indicator and were distilled to distill off 15.6 parts of 1,7-dicyanoheptene-3 at 120–135° C./1 mm. Hg. The yield was 71% based on the starting tribromoheptane.

*Example 5*

Into a three-mouth flask of 500 cc. provided with a thermometer, an agitator and a reflux condenser was placed a mixture (at a molar equivalent) of 50 parts of 1,4,7-trichloroheptane and 41 parts of 1,7-dichloroheptene-3 to which was then added 50.2 parts of sodium cyanide and 200 parts of dimethylformamide. The entire mixture was then heated at 120° C. under agitation. After 6 hours the reaction was brought to a stop and the decomposition described in Example 1 was employed to obtain 67.7 parts (93% yield) of 1,7-dicyanoheptene-3.

*Example 6*

Into an apparatus similar to the one in Example 5 was placed a mixture of 50 parts of 1,4,9-trichlorononane and 24 parts of 1,7-dichloroheptene-3 to which were then added 53 parts (50% excess) of sodium cyanide, 9 parts of sodium hydroxide, 200 parts of water and 3 parts of Quatamine No. 86 (an emulsifier made by Kao Soap Co., Ltd.). The contents of the flask were heated at 104° C. for 10 hours under agitation. On stoppage of agitation after completion of the reaction the solution formed two layers. The lower layer was withdrawn and the upper layer was distilled in that condition under reduced pressure of 22 mm. Hg.

The fraction distilled off at a temperature of more than 180° C., was distilled again to obtain, in substantially a pure state, 14.5 parts (68% yield) of 1,7-dicyanoheptene-3 and 2.47 parts (65% yield) of 1,9-dicyanononene-3 (or 1,9-dicyanononene-4).

*Example 7*

Into an apparatus similar to the one in Example 1 were placed 50 parts of 1,4,6-tribromohexane, 10.2 parts of lithium cyanide and 100 parts of dimethylsulfoxide and the mixture was heated at 130° C. for 2 hours. Then a solution, prepared by dissolving 6.2 parts of sodium hydroxide in 10 parts of water, was added dropwise over 30 minutes. During this period of time agitation was continued while maintaining the contents of the flask in the neighborhood of 100° C. After the dropwise addition, agitation was further continued for 1 hour and the contents of the flask were cooled, neutralized and distilled to obtain 14.6 parts (70% yield) of 1,6-dicyanohexene-2 (or 1,6-dicyanohexene-3).

*Example 8*

20.3 parts of 1,4,7-trichloroheptane, 16.7 parts of 1,7-dichloroheptene-3, 200 parts of dimethylsulfoxide, 3 parts of water and 16.5 parts of sodium hydroxide were placed in a 4-mouth flask of 500 cc. equipped with a thermometer, an agitator, a reflux condenser and a drop inlet. While maintaining this mixture at 20–30° C. it was thoroughly agitated and 5.5 parts of liquid hydrogen cyanide were added thereto drop by drop and the reaction temperature was gradually elevated to 125° C. where it was maintained for 6 hours. After removing inorganic matter by filtering the contents of the flask they were distilled. Subsequent to distilling off the solvent, distillation was carried out, while passing nitrogen gas, in the same way as in Example 1 to obtain 27 parts of 1,7-dicyanoheptene-3 at 190–210° C./mm. Hg. The yield was 91%.

Example 9

20.3 parts of 1,4,7-trichloroheptane, 16.7 parts of 1,7-dichloroheptene-3, 200 parts of dimethylsulfoxide, 3 parts of water and 20.4 parts of sodium hydroxide were placed in a reactor similar to the one in Example 8. While maintaining this mixture at 15–25° C., 5.5 parts of liquid hydrogen cyanide were added thereto drop by drop and the reaction temperature was gradually elevated. The contents of the reactor were heated at 90–100° C. for 1 hour and at 100–130° C. for 5 hours. Then, the contents were filtered and the filtrate was distilled to obtain 25.2 parts of 1,7-dicyanoheptene-3. The yield was 85%.

The trihaloalkane starting materials employed herein can be made in any convenient manner. An advantageous method of preparing trihaloalkanes is described in a copending application filed concurrently herewith and comprises the reaction of hydrogen halide with alpha-tetrahydrofuryl alkylhalide in the presence of more than one mol of water per mol of alpha-tetrahydrofuryl alkylhalide, in the presence of a metal halide catalyst, e.g., zinc chloride, and at a temperature of 70 to 115° C. to form the trihaloalkane.

The alpha,omega-dicyanoolefins produced by this invention are useful as polymerizable monomers, alone or in conjunction with other olefinic monomers, e.g., styrene, acrylonitrile or vinyl chloride, in the presence of peroxide catalysts, to form resinous materials which can be employed as protective coatings or plastic films.

What is claimed is:

1. Process of making alpha, omega-dicyanoolefins comprising reacting a trihaloalkane having the formula:

$$X(CH_2)_nCH(CH_2)_mX$$
$$|$$
$$X$$

wherein X is a halogen selected from the group consisting of chlorine, bromine and iodine, $m$ and $n$ each is an integer of at least 2 and $m+n$ is an integer of 5 to 10, with from 2 to 2.5 mols per mol of trihaloalkane of a reactant from the class consisting of alkali metal cyanides and mixtures of hydrogen cyanide and an alkali metal hydroxide at a temperature of 15 to 160° C. to nitrilize the terminal halogen thereby forming an alpha, omega-dicyanohaloalkane; and thereafter dehydrohalogenating said dicyanohaloalkane by heating at a temperature of 150 to 320° C. to form said alpha,omega-dicyanoolefin.

2. Process as claimed in claim 1 wherein said trihaloalkane is a trichloroalkane and X in said formula is chlorine, said reactant is an alkali metal cyanide which is reacted with said trichloroalkane at a temperature of 70 to 160° C. and said dehydrohalogenation step is carried out by heating at 200 to 320° C.

3. Process as claimed in claim 1 wherein said trihaloalkane is tribromoalkane wherein X of said formula is bromine, said reactant is an alkali metal cyanide which is reacted with said tribromoalkane at a temperature of 15 to 150° C. and said dehydrohalogenation step is carried out by heating at 150 to 200° C.

4. Process of making alpha,omega-dicyanoolefins comprising reacting a trihaloalkane having the formula:

$$X(CH_2)_nCH(CH_2)_mX$$
$$|$$
$$X$$

wherein X is a halogen selected from the group consisting of chlorine, bromine and iodine, $m$ and $n$ each is an integer of at least 2 and $m+n$ is an integer of 5 to 10, with from 2 to 2.5 mols per mol of trihaloalkane of a reactant from the class consisting of alkali metal cyanides and mixtures of hydrogen cyanide and an alkali metal hydroxide at a temperature of 15 to 160° C. to nitrilize the terminal halogen thereby forming an alpha, omega-dicyanohaloalkane; and thereafter dehydrohalogenating said dicyanohaloalkane in the presence of an alkali metal hydroxide at a temperature of 30 to 130° C.

5. Process as claimed in claim 4 wherein said trihaloalkane is tribromoalkane wherein X of said formula is bromine, said reactant is an alkali metal cyanide which is reacted with said tribromoalkane at a temperature of 15 to 150° C.

6. Process of making alpha,omega-dicyanoolefins comprising reacting a trihaloalkane having the formula:

$$X(CH_2)_nCH(CH_2)_mX$$
$$|$$
$$X$$

wherein X is a halogen selected from the group consisting of chlorine, bromine and iodine, $m$ and $n$ each is an integer of at least 2 and $m+n$ is an integer of 5 to 10, from 2 to 2.5 mols hydrogen cyanide per mol of trihaloalkane and an alkali metal hydroxide at a temperature of 15 to 160° C. to form a second mixture containing alpha,omega-dicyanohaloalkane and alkali metal hydroxide, and maintaining said mixture at a temperature of 30 to 130° C. to dehydrohalogenate said dicyanohaloalkane to form said alpha,omega-dicyanoolefin.

7. Process as claimed in claim 6 wherein said trihaloalkane is trichloroalkane wherein X of said formula is chlorine.

8. Process of making 1,7-dicyanoheptene-3 comprising reacting sodium cyanide with 1,4,7-trichloroheptane in a ratio of from 2 to 2.5 mols sodium cyanide per mol of 1,4,7-trichloroheptane at a temperature of 70 to 160° C. in the presence of ethylene glycol monomethyl ether as a solvent to form 1,7-dicyano-4-chloroheptane and thereafter heating said 1,4-dicyanochloroheptane at a temperature of 200 to 320° C. to form said 1,7-dicyanoheptene-3.

9. Process of making a mixture of 1,9-dicyanononene-3 and 1,9-dicyanononene-4 comprising reacting 1,4,9-trichlorononane with sodium cyanide in a ratio of from 2 to 2.5 mols sodium cyanide per mol of 1,4,9-trichlorononane in the presence of ethylene glycol monoethyl ether at a temperature of 70 to 160° C. to form 1,9-dicyano-4-chlorononane and thereafter heating said 1,9-dicyano-4-chlorononane at a temperature of 200 to 320° C. to form the mixture of said 1,9-dicyanononene-3 and 1,9-dicyanononene-4.

10. Process for preparing 1,7-dicyanoheptene-3 comprising reacting 1,4,7-tribromoheptane with potassium cyanide in a ratio of from 2 to 2.5 mols potassium cyanide per mol of 1,4,7-tribromoheptane in the presence of a mixture of ethanol and water as solvent at a temperature of 15 to 150° C. to form 1,7-dicyano-4-bromoheptane and thereafter heating said 1,7-dicyano-4-bromoheptane at a temperature of 150 to 200° C. to form 1,7-dicyanoheptene-3.

11. Process of making 1,7-dicyanoheptene-3 comprising reacting 1,4,7-tribromoheptane with a mixture containing potassium cyanide and sodium cyanide in a ratio of from 2 to 2.5 mols of said cyanide mixture per mol of 1,4,7-tribromoheptane in the presence of a mixture of ethanol and water as solvent at a temperature of 15 to 150° C. to form 1,7-dicyano-4-bromoheptane and thereafter heating said 1,7-dicyano-4-bromoheptane in the presence of sodium hydroxide at a temperature of 30 to 130° C. to form said 1,7-dicyanoheptene-3.

12. Process for making 1,7-dicyanoheptene-3 comprising reacting a mixture of 1,4,7-trichloroheptane and 1,7-dichloroheptene-3 with sodium cyanide in a ratio of from 2 to 2.5 mols sodium cyanide per mol of said mixture in the presence of dimethylformamide as solvent at a temperature of 70 to 160° C. to form a mixture containing 1,7-dicyano-4-chloroheptane and thereafter heating said mixture containing 1,7-dicyano-4-chloroheptane at a temperature of 200 to 320° C. to form 1,7-dicyanoheptene-3.

13. Process for making a mixture of 1,6-dicyanohexene-2 and 1,6-dicyanohexene-3 comprising reacting 1,4,6-tribromohexane with lithium cyanide in a ratio of from 2 to 2.5 mols lithium cyanide per mol of 1,4,6-tribromohexane in the presence of dimethylsulfoxide as solvent at a temperature of 15 to 150° C. and thereafter heating the resulting reaction mixture at a temperature of 30 to 130° C. in the presence of sodium hydroxide to form the mixture of 1,6-dicyanohexene-2 and 1,6-dicyanohexene-3.

14. Process for making 1,7-dicyanoheptene-3 comprising reacting a mixture of 1,4,7-trichloroheptane and 1,7-dichloroheptene-3 with sodium hydroxide and hydrogen cyanide in a ratio of from 2 to 2.5 mols hydrogen cyanide per mol of said mixture in the presence of dimethylsulfoxide as solvent at a temperature of 70 to 160° C. to form said 1,7-dicyanoheptene-3.

References Cited by the Examiner

"The Condensed Chemical Dictionary," 6th ed., 1961, page 735, Reinhold Publishing Corp., New York.

CHARLES B. PARKER, *Primary Examiner.*